US010095307B2

(12) United States Patent
Raffle et al.

(10) Patent No.: US 10,095,307 B2
(45) Date of Patent: Oct. 9, 2018

(54) EYE TRACKING SYSTEMS AND METHODS FOR VIRTUAL REALITY ENVIRONMENTS

(71) Applicant: GOOGLE INC., Mountain View, CA (US)

(72) Inventors: Hayes S. Raffle, Palo Alto, CA (US); Xinda Hu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/386,961

(22) Filed: Dec. 21, 2016

(65) Prior Publication Data

US 2017/0329398 A1     Nov. 16, 2017

Related U.S. Application Data

(60) Provisional application No. 62/336,169, filed on May 13, 2016.

(51) Int. Cl.

| G06F 3/00 | (2006.01) |
|---|---|
| G06F 3/01 | (2006.01) |
| G02B 27/01 | (2006.01) |
| G02B 27/00 | (2006.01) |
| H04N 5/33 | (2006.01) |
| G02B 5/28 | (2006.01) |

(52) U.S. Cl.
CPC ......... *G06F 3/013* (2013.01); *G02B 27/0093* (2013.01); *G02B 27/0172* (2013.01); *H04N 5/33* (2013.01); *G02B 5/282* (2013.01)

(58) Field of Classification Search
CPC . G06F 3/013; G02B 27/0172; G02B 27/0093; G02B 5/282; H04N 5/33
See application file for complete search history.

(56) References Cited

U.S. PATENT DOCUMENTS

2016/0180591 A1   6/2016   Shiu et al.

FOREIGN PATENT DOCUMENTS

| EP | 2993577 A1 | 3/2016 |
| WO | 2015/198477 A1 | 12/2015 |
| WO | 2015/198502 A1 | 12/2015 |

OTHER PUBLICATIONS

International Search Report and Written Opinion received for PCT Patent Application No. PCT/US2016/068481, dated Feb. 17, 2017, 14 pages.
Stengel et al., "An Affordable Solution for Binocular Eye Tracking and Calibration in Head-mounted Displays", Proceedings of ACM International Conference on Multimedia, 2015, 10 pages.

*Primary Examiner* — Muhammad N Edun
(74) *Attorney, Agent, or Firm* — Brake Hughes Bellermann LLP

(57) ABSTRACT

Eye tracking methods and systems for virtual reality (VR) environments are disclosed herein. An example method includes receiving light through a lens positioned in an opening defined through a surface of a head-mounted display (HMD), reflecting an infrared light portion of the light off a display device of the HMD, the display device oriented generally parallel to the lens, and performing eye tracking based on the reflected infrared portion of the light.

21 Claims, 13 Drawing Sheets

EYE TRACKING SYSTEMS AND METHODS FOR VIRTUAL REALITY ENVIRONMENTS

RELATED APPLICATION(S)

This application claims the priority benefit of U.S. Provisional Patent Application No. 62/336,169, filed on May 13, 2016, the entirety of which is incorporated herein by reference.

FIELD OF THE DISCLOSURE

This disclosure relates generally to virtual reality (VR) environments, and, more particularly, to eye tracking methods and systems for VR environments.

BACKGROUND

VR environments provide users with applications with which they can interact with virtual objects. In some examples, eye tracking is used to interact with virtual objects and virtual environments.

SUMMARY

Eye tracking methods and systems for VR environments are disclosed herein. An example method includes receiving light through a lens positioned in an opening defined through a surface of a head-mounted display (HMD), reflecting an infrared light portion of the light off a display device of the HMD, the display device oriented generally parallel to the lens, and performing eye tracking based on the reflected infrared portion of the light.

DETAILED DESCRIPTION

Figure 1:
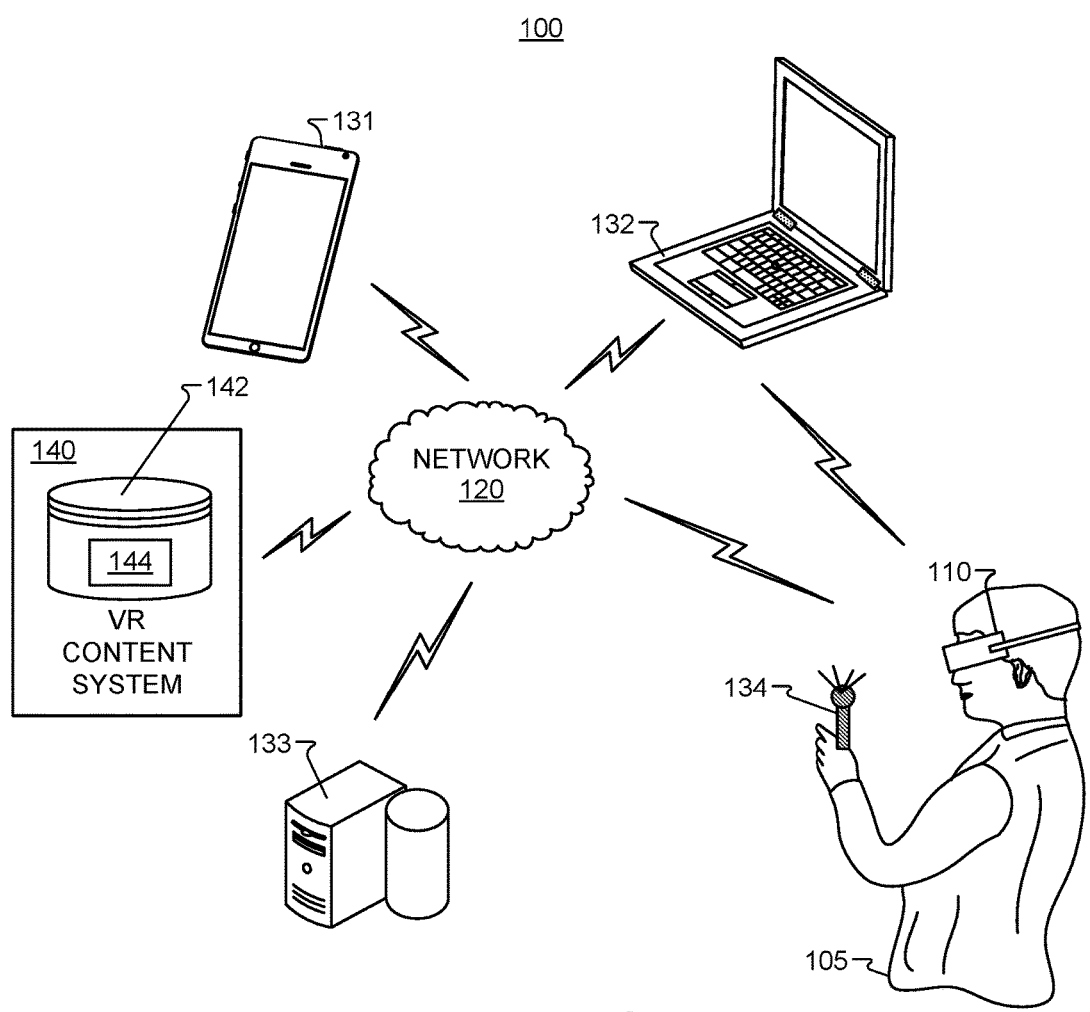
FIG. 1 is a block diagram of an example three-dimensional (3D) VR environment in accordance with this disclosure.

Eye tracking provides numerous advantages in virtual reality (VR) environments and VR applications. For example, eye tracking may be used with see and click actions, e.g., gaze on an object and blink your eye to select the object. Additionally, eye tracking may be used to optimize the rendering of high-definition (HD) content. For instance, it can be used to facilitate foveated rendering by rendering only parts of a scene in HD that are being focused on, rather than rendering the entire scene in HD, thus reducing processing load. Further, eye tracking may be used to perform iris recognition as a part of a biometric system, both for user authentication and user identification.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Turning to FIG. 1, a block diagram of an example VR system 100 for creating and interacting with a three-dimensional (3D) VR environment in accordance with the teachings of this disclosure is shown. In general, the system 100 provides the 3D VR environment and VR content for a user to access, view, and interact with using the examples described herein. The system 100 can provide the user with options for accessing the content, applications, virtual objects, and VR controls using, for example, eye tracking and/or movements within the VR environment. The example VR system 100 of FIG. 1 includes a user 105 wearing a head-mounted display (HMD) 110. In the examples disclosed herein, the HMDs including eye tracking thereby allowing the VR system 100 to realize at least the benefits discussed above.

As shown in FIG. 1, the example VR system 100 includes multiple computing and/or electronic devices that can exchange data over a network 120. The devices may represent clients or servers, and can communicate via the network 120 or any other additional and/or alternative network(s). Example client devices include, but are not limited to, a mobile device 131 (e.g., a smartphone, a personal digital assistant, a portable media player, etc.), an electronic tablet (not shown), a laptop or netbook 132, a camera (not shown), the HMD 110, a desktop computer 133, a VR controller 134, a gaming device (not shown), and any other electronic or computing devices that can communicate using the network 120 or other network(s) with other computing or electronic devices or systems, or that may be used to access VR content or operate within a VR environment. The devices 110 and 131-134 may represent client or server devices. The devices 110 and 131-134 can execute a client operating system and one or more client applications that can access, render, provide, or display VR content on a display device included in or in conjunction with each respective device 110 and 131-134. The devices 110 and 131-134 can execute VR applications that, among other things, take advantage of eye tracking carried out by the HMD 110 or other HMDs disclosed herein.

The VR system 100 may include any number of VR content systems 140 storing content and/or VR software modules (e.g., in the form of VR applications 144) that can generate, modify, or execute VR scenes. In some examples, the devices 110 and 131-134 and the VR content system 140 include one or more processors and one or more memory devices, which can execute a client operating system and one or more client applications. The HMD 110, the other devices 131-133 or the VR content system 140 may be implemented by the example computing devices P00 and P50 of FIG. 14.

The VR applications 144 can be configured to execute on any or all of devices 110 and 131-134. The HMD device 110 can be connected to devices 131-134 to access VR content on VR content system 140, for example. Device 131-134 can be connected (wired or wirelessly) to HMD device 110, which can provide VR content for display. A user's VR system can be HMD device 110 alone, or a combination of device 131-134 and HMD device 110.

FIGS. 2-6 illustrate example methods of performing eye tracking in an HMD in accordance with the teachings of this disclosure. The examples of FIGS. 2-6 are shown and described with reference to one eye. However, it should be understood that HMDs support two eyes and that they are substantially identical between the eyes, at least as regards eye tracking.

Figure 2:
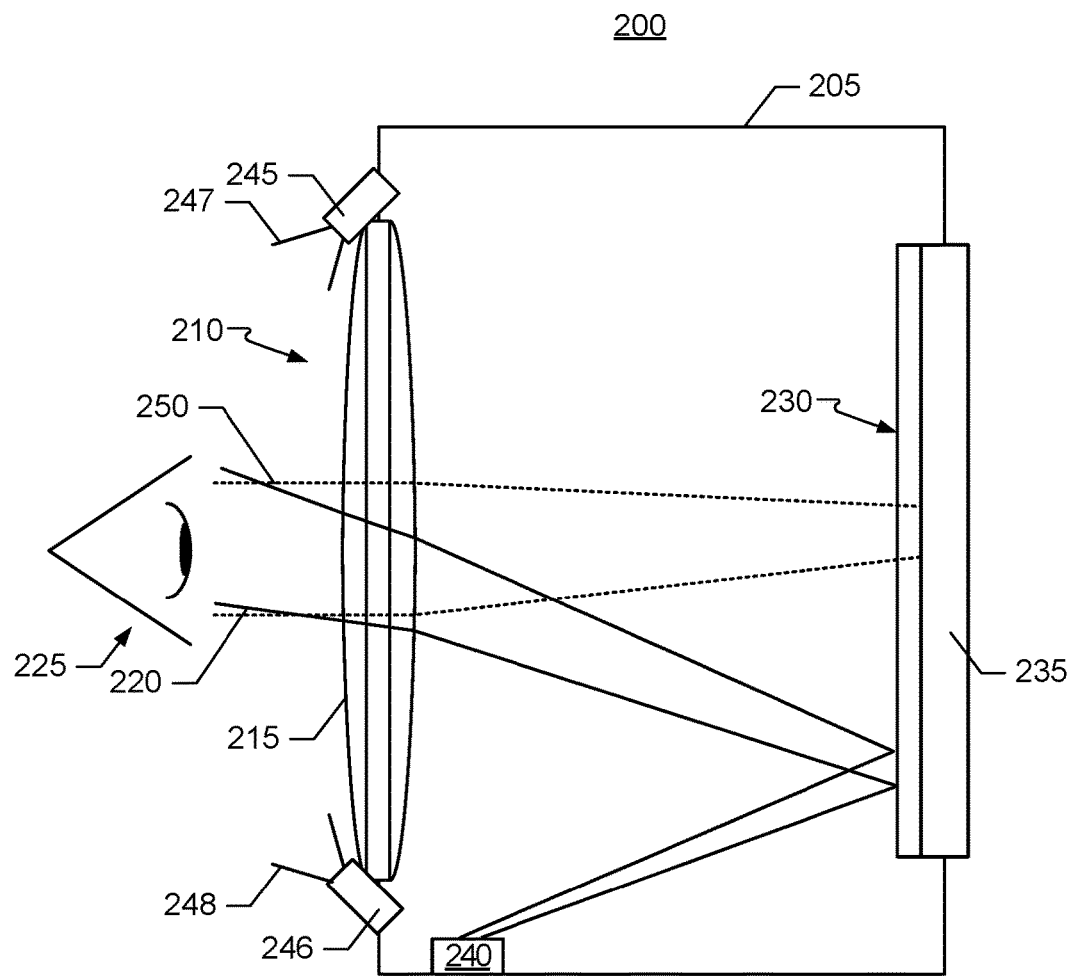
FIG. 2 is a diagram illustrating an example method of performing eye tracking in accordance with the teachings of this disclosure.

The example HMD 200 of FIG. 2 includes a housing 205 having an opening 210 defined therethrough to receive a lens 215. The lens 215 focuses light (one ray of which is designated at reference numeral 220) reflected by an eye 225 onto a surface (e.g., a coating, a layer, etc.) of a display device 235. The light 220 focused on the layer 230 is reflected by the layer 230 onto an imaging device 240. When configured to reflect infrared light and pass visible light, the layer 230 operates as a beam splitter. In some examples, the display device 235 is a smartphone, or other device, such as the mobile device 131 of FIG. 1, that can be used for purposes other than with the HMD 200. The imaging device 240 either independently, or conjunction with other components, determines the position of the eye 225 in X, Y and Z coordinates. The imaging device 240 is described in more detail below in connection with FIG. 9.

Figure 3:
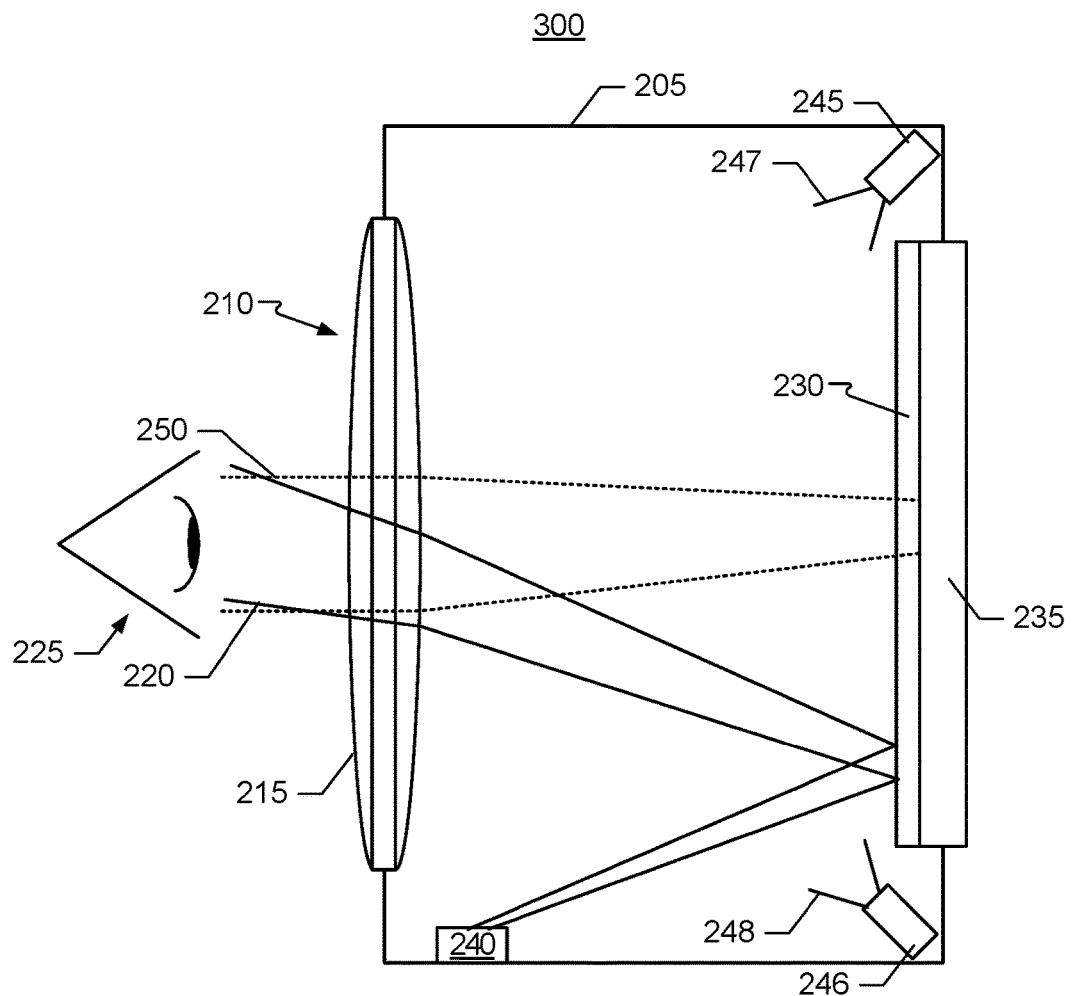
FIG. 3 is a diagram illustrating another example method of performing eye tracking in accordance with the teachings of this disclosure.

To illuminate the eye 225, the example HMD 200 includes one or more light-emitting diodes (LEDs), two of which are designated with reference numerals 245 and 246. In some examples, the LED(s) 245 emit infrared light (two rays of which are designated at reference numerals 247 and 248) so as not to interfere with visible light (one ray of which is designated at reference numeral 250) emitted by the display device 235. In other examples, visible light LEDs may be used. In some examples, LEDs can selectively emit infrared and visible light. In the example of FIG. 3, the LED(s) 245 are external to the lens 215. However, as shown in FIG. 3, the LED(s) 245 may instead be implemented inside an HMD 300. In may be advantageous in some instances to implement the LED(s) 245 exteriorly to reduce or avoid Fresnel reflections. While a single lens is shown in FIGS. 2 and 3, more than one lens may be implemented in any number of arrangements. Further, more than two LEDs may be used. In some examples, LEDs are placed in a ring around the lens 215, and are angled toward the eye 225. An optical barrier may be placed between the LEDs and the lens 215 to avoid leakage of light emitted by the LEDs into the lens 215.

In an example operation, the LED(s) 245 are turned on and emit infrared light, the infrared light reflects off the eye 225 back into the HMD 200 via the lens 215. The light passing in through the lens 215 is reflected by the layer 230 such that only an infrared light portion of the light is reflected toward the imaging device 240. The remaining visible light portion of the light is passed through. The imaging device 240 captures infrared images and computes eye positions.

As shown, the lens 215 and the display device 235 are generally parallel. Differences from parallel are well understood to include, among other things, manufacturing tolerances, shifting of components during use or shipping, etc.

In some examples, the layer 230 is a dichroic coating, or a screen protector comprising a dichroic material. In some other examples, the layer 230, instead of being part of the display device 235 is fixedly attached or affixed to the HMD 200, and remains attached to the HMD 200 even if the display device 235 is removed. In such examples, the layer 230 is intended by the manufacturer to remain fixed to the housing 205 after manufacture of the HMD 200, and damage to the HMD 200 may occur if the layer 230 is removed. In some examples, the display 235 is removably attached, mounted or affixed to the housing in that it can be, for example, attached to the HMD 200, removed from the HMD 200, and re-attached to the HMD 200 without any intended impact to functionality or performance to the HMD 200 except, of course, when the display device 235 is not attached.

Figure 4:
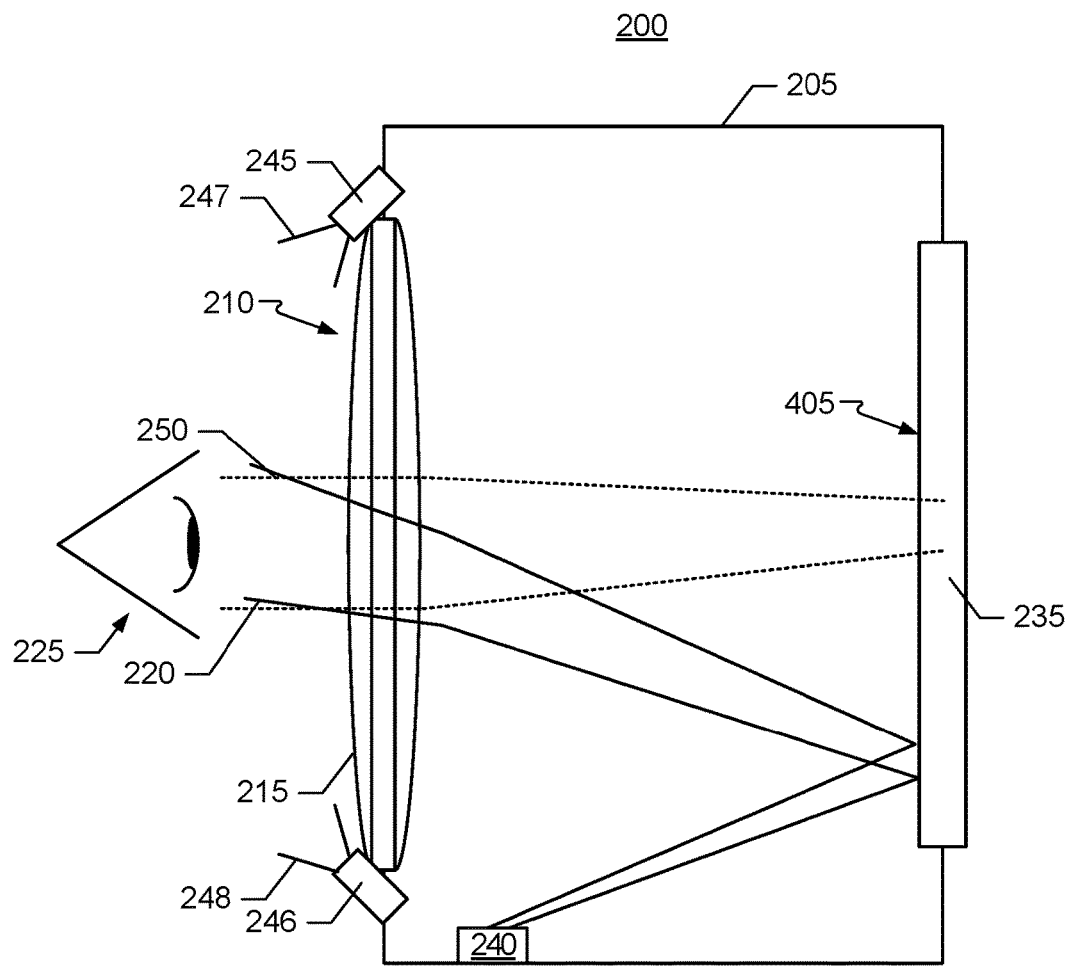
FIG. 4 is a diagram illustrating yet another example method of performing eye tracking in accordance with the teachings of this disclosure.

In some examples, such as that shown in the example HMD 400 of FIG. 4, the layer 230 can be omitted and Fresnel reflections off a surface 405 of the display device 230 itself are used. When light moves from a medium (e.g., air in FIG. 4) of a given refractive index, n1, into a second medium (e.g., the display device 230) with refractive index, n2, both reflection and refraction of the light may occur. The Fresnel equations describe what fraction of the light is reflected and what fraction is refracted (i.e., transmitted). Because the infrared light 247, 248 and the visible light 250 have different wavelengths they will experience different refractions and reflections. Thus, the visible light 250 passes through the display device 230 to the eye 225, and the infrared light 220 is reflected off the display device 230 to the imaging device 240

Figure 5:
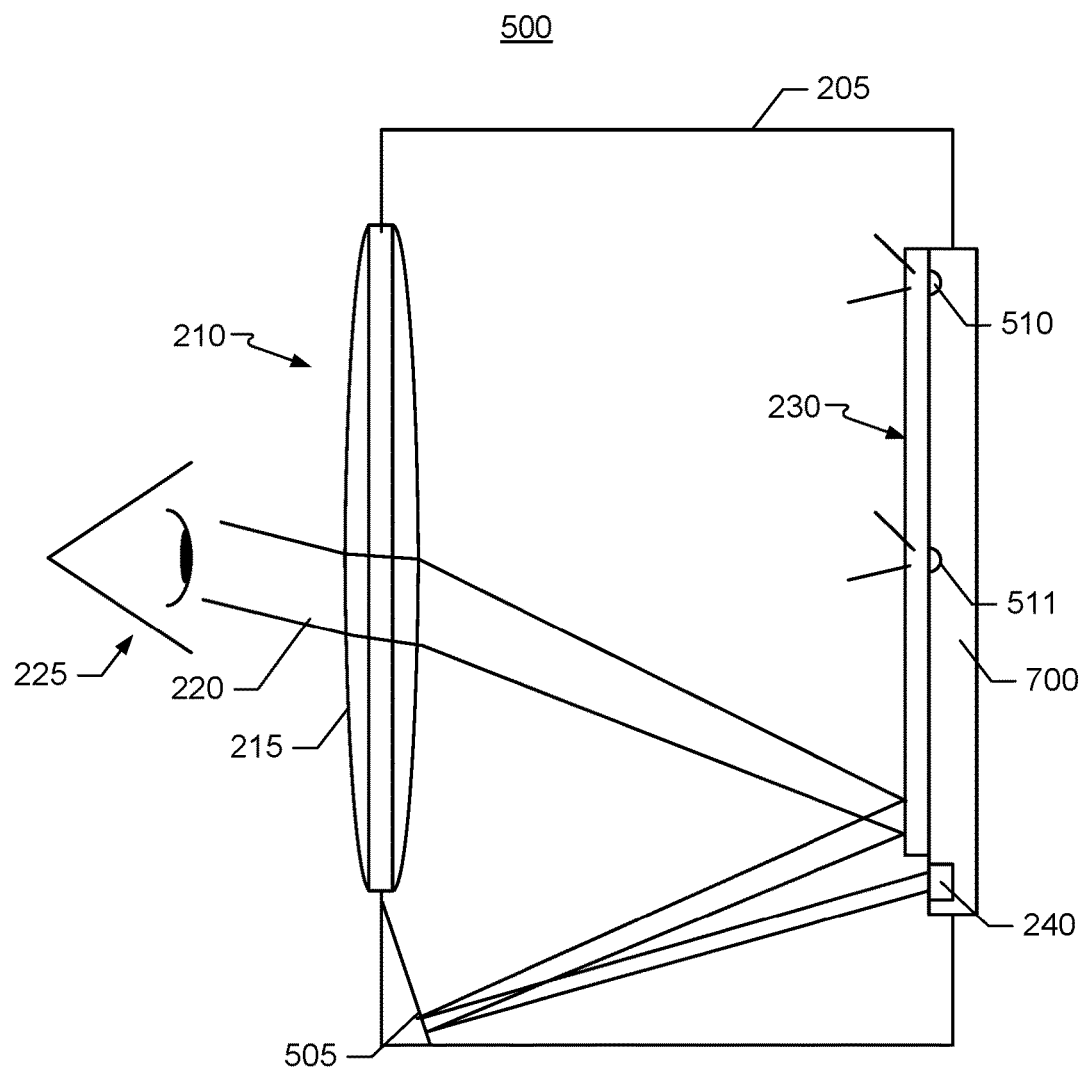
FIG. 5 is a diagram illustrating still another example method of performing eye tracking in accordance with the teachings of this disclosure.
Figure 6:
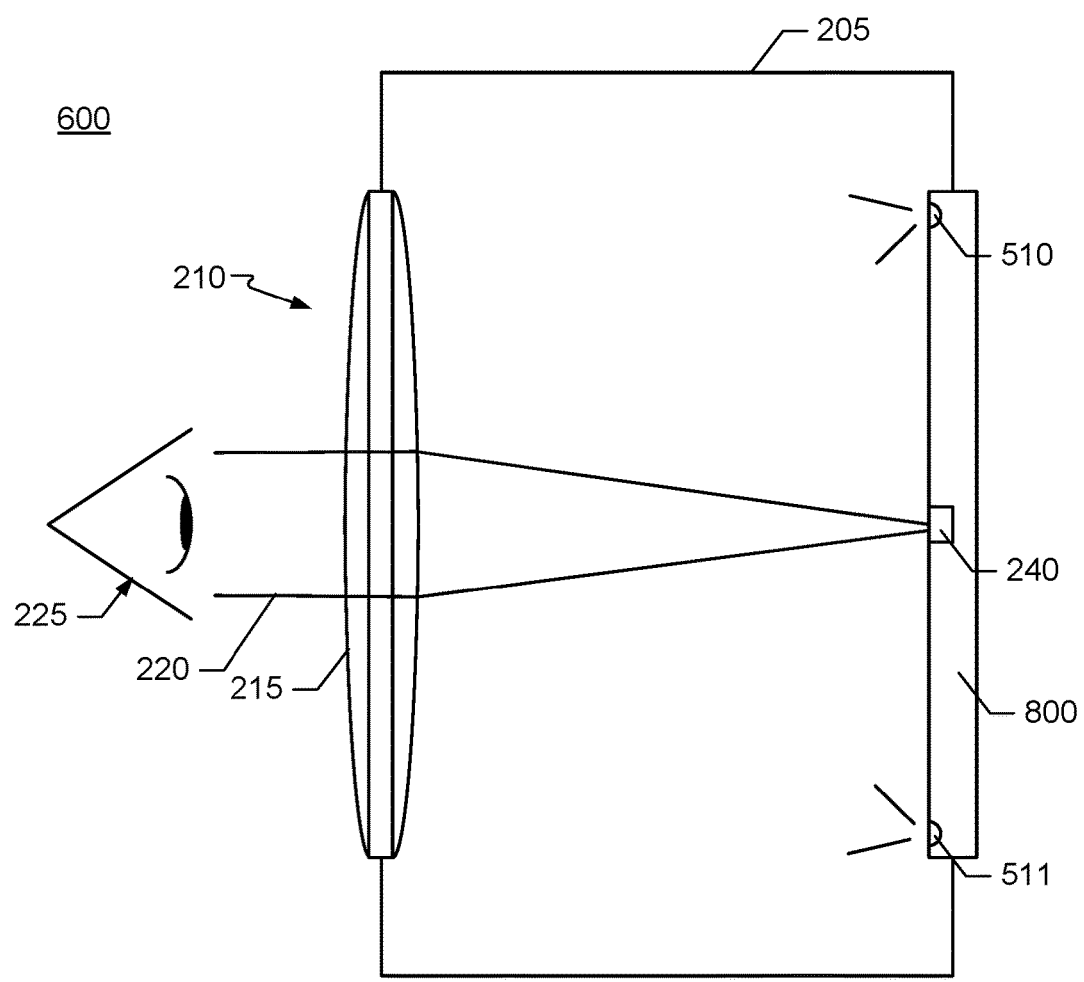
FIG. 6 is a diagram illustrating a further example method of performing eye tracking in accordance with the teachings of this disclosure.
Figure 7:
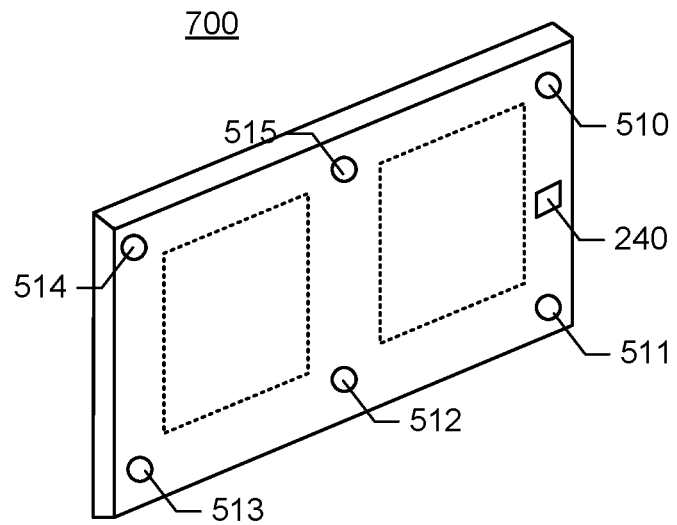
FIG. 7 is an illustration of an example display device in accordance with the teachings of this disclosure.
Figure 8:
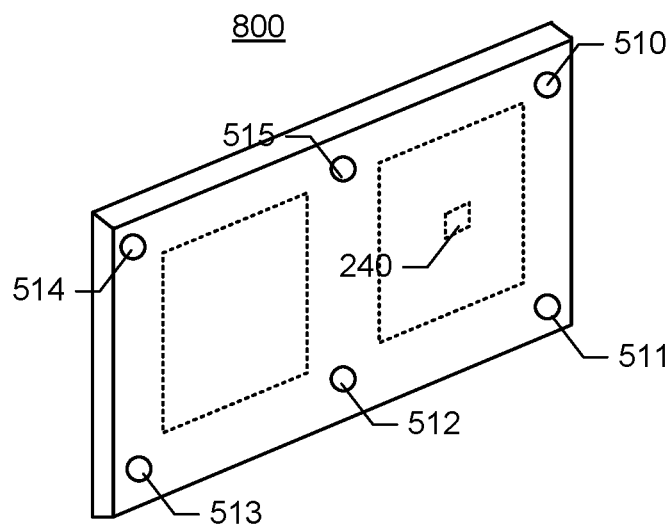
FIG. 8 is an illustration of another example display device in accordance with the teachings of this disclosure.

In comparison to FIGS. 2-4, an example HMD 500 shown in FIG. 5 implements all or part of the imaging device 240 in connection with an HMD or VR ready device 700 (see FIG. 7). Accordingly, the example HMD 500 includes an additional reflective element (e.g., a mirror) 505 that reflects the light reflected by the surface 230 back toward and onto the imaging device 240. If, as shown in the example HMD 600 of FIG. 6, the imaging device 240 is positioned more centrally, the additional reflective element 505 may be omitted, and an HMD or VR ready device 800 (see FIG. 8) as the display device 235 may be used.

The optic architecture of FIGS. 5 and 6 can take advantage of the cameras typically included in display devices 700 such as smartphones. However, as infrared light has benefits for eye tracking, some benefit to modify cameras to image infrared as well as visible light may arise. In some examples, the imaging device 240 of FIGS. 5 and 6 may be implemented behind the LCD layer of the display device 700, such that the imaging device 240 does not interrupt images displayed by the display device 700. As shown in the examples of FIGS. 5-8, LED(s) (two of which are designated at reference numerals 510 and 510 in FIGS. 5 and 6, and six of which are designated at reference numerals 510-515 in FIGS. 7 and 8) may be implemented as part of the display devices 700 and 800. The LED(s) 510 may, for example, be positioned around the edge of the devices 700 and 800. In some example, the LEDs 245 and 246 are additionally included.

Figure 9:
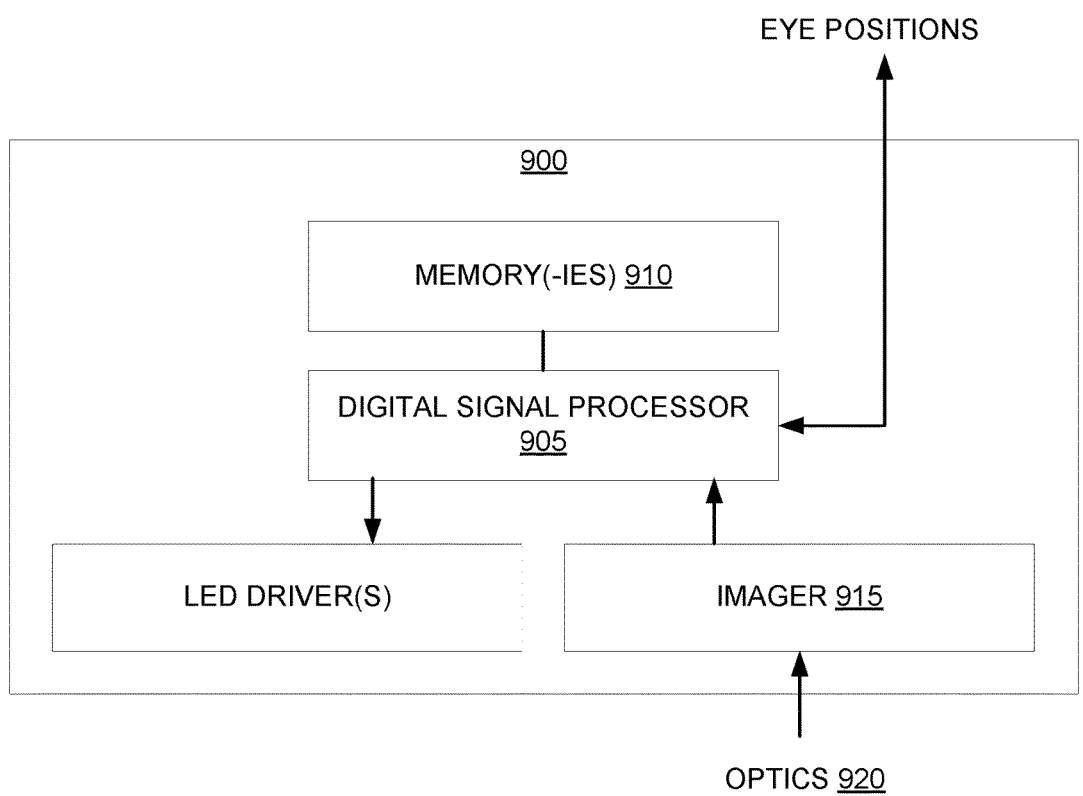
FIG. 9 is a schematic diagram of an example imaging device that may be used to perform eye tracking in accordance with the teachings of this disclosure.

Turning to FIG. 9, an example imaging device 900 that may be used to implement the example imaging device 240 is shown. In some examples, the example imaging device 900 is a low-power application specific integrated circuit (ASIC) implementing a vision-on-a-chip device. The device 900 includes a digital signal processor (DSP) 905 having machine-readable memory(-ies) 910, although other types of processors may, additionally or alternatively, be used. The DSP 905 executes computer-readable instructions stored on the memory(-ies) to control, operate, etc. the device 900.

The DSP 905 obtains images captured by a low-power, low-resolution imager 915 such as the imaging sensor of an optical mouse. As described above, the imager 915 captures images of infrared light focused on the imager 915 by optics 920, which includes lenses, mirrors, etc. as described above. Using any number and/or type(s) of method(s), algorithm(s), logic, etc., the DSP 905 processes images captured by the imager 915 to determine eye positions. The DSP 905 sends determined eye position data (e.g., X, Y and Z coordinates) to the display device 235, 700 or 800, or other devices in a VR system such as the example devices 131-134. In some examples, the eye position data is sent via Bluetooth or USB. The eye position data may be sent periodically and/or on demand.

To control LED(s) such as the LED(s) 245 and 510, the example device 900 includes LED driver(s) 925. The DSP 905 sends command to the LED driver(s) 925 to turn LED(s) on and off.

Figure 10:
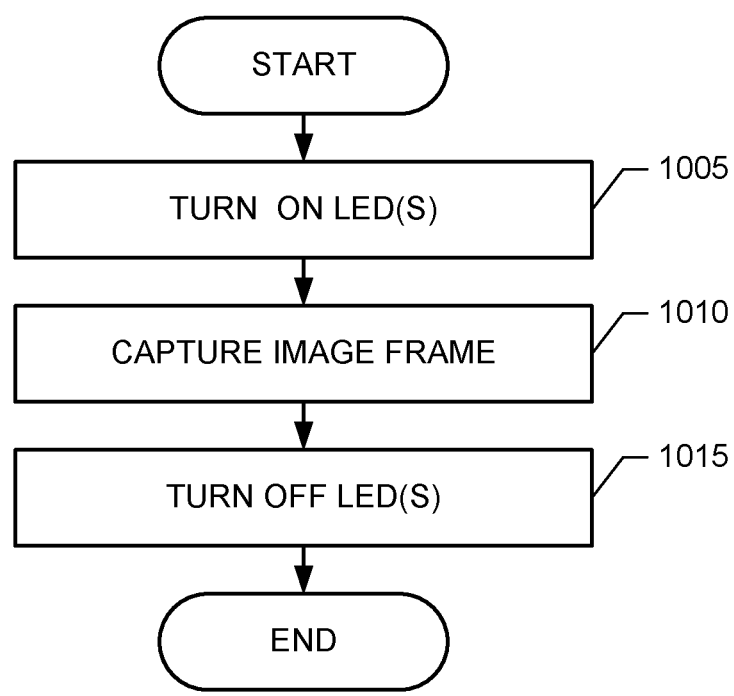
FIG. 10 is a flowchart representing an example method of performing eye tracking in accordance with the teachings of this disclosure.
Figure 14:
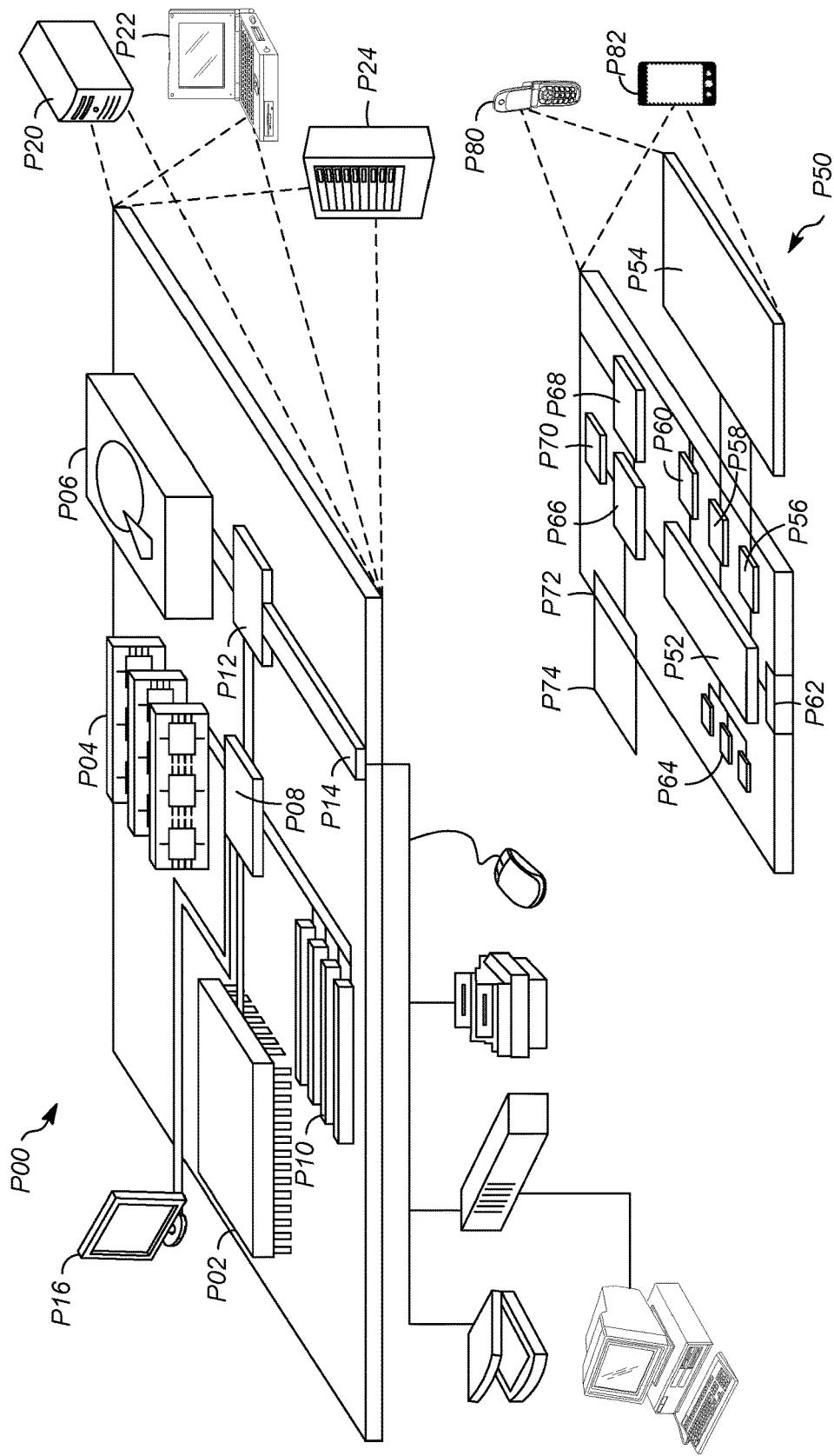
FIG. 14 is a block diagram of an example computer device and an example mobile computer device, which may be used to implement the examples disclosed herein.

FIG. 10 is a flowchart of an example process 1000 that may, for example, be implemented as machine-readable instructions carried out by one or more processors, such as the example DSP 905 of FIG. 9 and/or the processors of FIG. 14, to capture an image frame for using in performing eye tracking. The example process 1000 of FIG. 10 includes the DSP 905 controlling the LED driver(s) 925 to turn on LED(s) 245,510 (block 1005), and capturing an image frame via the imager 915 (block 1010), and controlling the LED driver(s) 925 to turn off LED(s) 245, 510 (block 1015).

Figure 11:
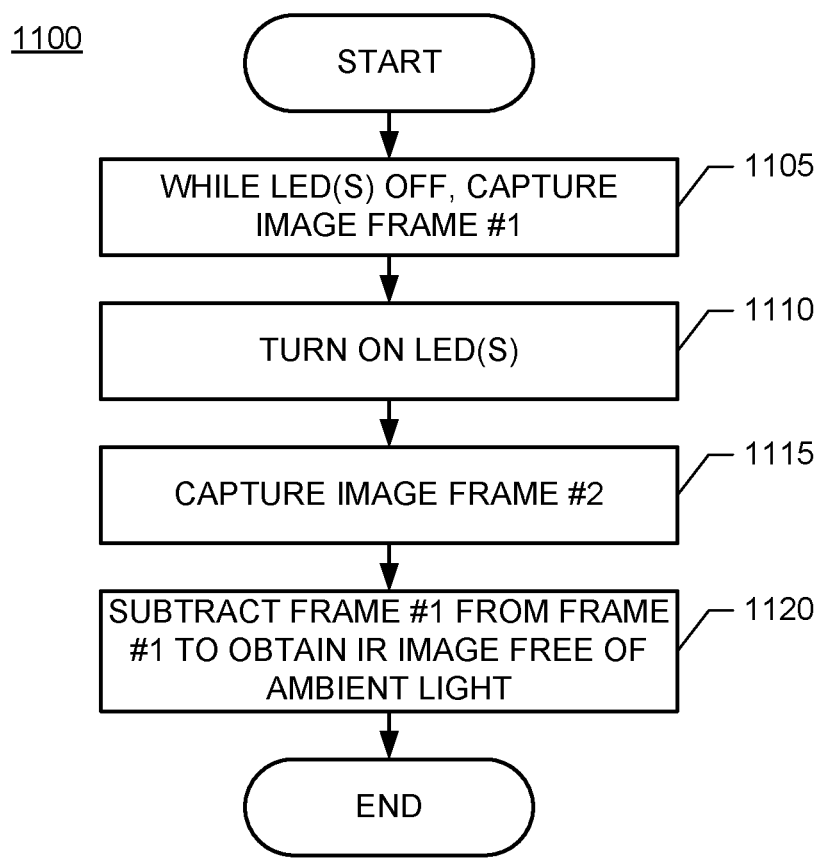
FIG. 11 is a flowchart representing another example method of performing eye tracking in accordance with the teachings of this disclosure.

FIG. 11 is a flowchart of an example process 1100 that may, for example, be implemented as machine-readable instructions carried out by one or more processors, such as the example DSP 905 of FIG. 9 and/or the processors of FIG. 14, to remove the ambient light from image frames to improve eye tracking performance. The example process 1100 of FIG. 11 includes the DSP 905 capturing an image frame via the imager 915 while the LED(s) 245, 510 are off (block 1105), controlling the LED driver(s) 925 to turn on LED(s) 245,510 (block 1110), capturing a second image frame via the imager 915 with the LED(s) 245, 510 on (block 1115), and subtracting the first image frame from the second image frame (block 1120).

Figure 12:
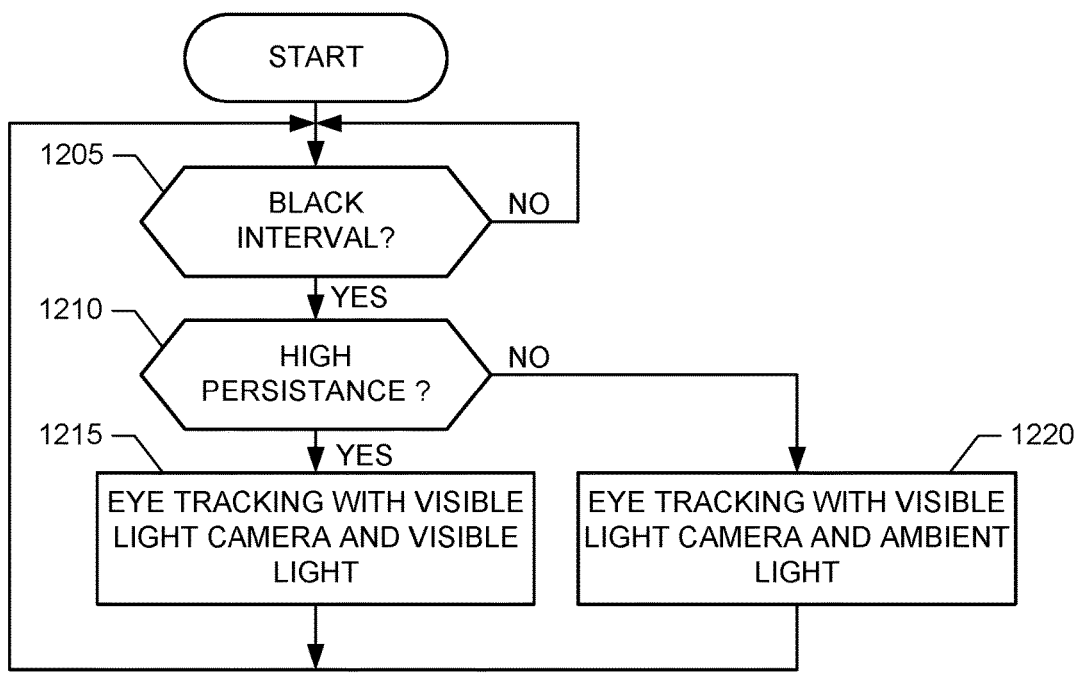
FIG. 12 is a flowchart representing yet another example method of performing eye tracking in accordance with the teachings of this disclosure.

FIG. 12 is a flowchart of an example process 1200 that may, for example, be implemented as machine-readable instructions carried out by one or more processors, such as the example DSP 905 of FIG. 9 and/or the processors of FIG. 14, to take advantage of black intervals between video frames to capture images for eye tracking. The example process 1200 of FIG. 12 includes the DSP 905 waiting for a black interval (block 1205). When a black interval begins (block 1205), the DSP 905 determines whether high or low persistence video is being used (block 1210). If high persistence is being used (block 1210), the DSP 905 controls the LED(s) 245, 510 and imager 915 to capture a visible light image taken with visible light (block 1215) and control returns to block 1205 to wait for another black interval. If low persistence is being used (block 1210), the DSP 905 controls the LED(s) 245, 510 and imager 915 to capture a visible light image taken with ambient light (block 1220) and control returns to block 1205 to wait for another black interval.

Figure 13:
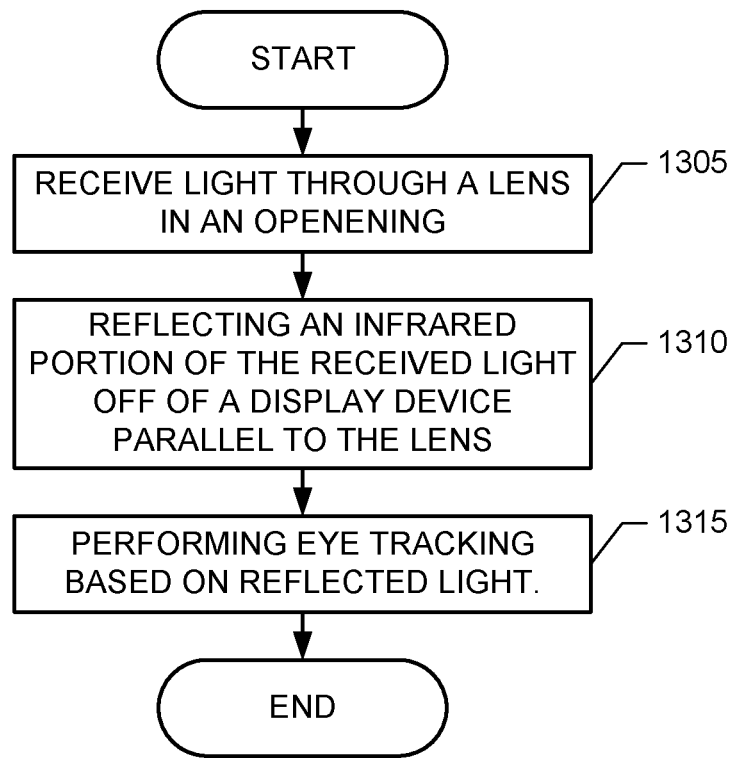
FIG. 13 is a flowchart representing still another example method of performing eye tracking in accordance with the teachings of this disclosure

FIG. 13 is a flowchart of an example process 1300 that includes a lens, such as the lens 220, receiving light (block 1305), and a display device reflecting an infrared portion of the received light, the display device being generally parallel to the lens (block 1310). An imaging device, such as the imaging device 240, performs eye tracking based on the reflected infrared light (block 1315). Control then exits from the example process of FIG. 13.

Returning to FIG. 1, the HMD device 110 may represent a VR headset, glasses, an eyepiece, or any other wearable device capable of displaying VR content. In operation, the HMD device 110 can execute a VR application 144 that can playback received, rendered and/or processed images for a user. In some instances, the VR application 144 can be hosted by one or more of the devices 131-134.

In some examples, the mobile device 131 can be placed, located or otherwise implemented in conjunction within the HMD device 110. The mobile device 131 can include a display device that can be used as the screen for the HMD device 110. The mobile device 131 can include hardware and/or software for executing the VR application 144.

In some implementations, one or more content servers (e.g., VR content system 140) and one or more computer-readable storage devices can communicate with the computing devices 110 and 131-134 using the network 120 to provide VR content to the devices 110 and 131-134.

In some implementations, the mobile device 131 can execute the VR application 144 and provide the content for the VR environment. In some implementations, the laptop computing device 132 can execute the VR application 144 and can provide content from one or more content servers (e.g., VR content server 140). The one or more content servers and one or more computer-readable storage devices can communicate with the mobile device 131 and/or laptop computing device 132 using the network 120 to provide content for display in HMD device 106.

In the event that HMD device 106 is wirelessly coupled to device 102 or device 104, the coupling may include use of any wireless communication protocol. A non-exhaustive list of wireless communication protocols that may be used individually or in combination includes, but is not limited to, the Institute of Electrical and Electronics Engineers (IEEE®) family of 802.x standards a.k.a. Wi-Fi® or wireless local area network (WLAN), Bluetooth®, Transmission Control Protocol/Internet Protocol (TCP/IP), a satellite data network, a cellular data network, a Wi-Fi hotspot, the Internet, and a wireless wide area network (WWAN).

In the event that the HMD device 106 is electrically coupled to device 102 or 104, a cable with an appropriate connector on either end for plugging into device 102 or 104 can be used. A non-exhaustive list of wired communication protocols that may be used individually or in combination includes, but is not limited to, IEEE 802.3x (Ethernet), a powerline network, the Internet, a coaxial cable data network, a fiber optic data network, a broadband or a dialup modem over a telephone network, a private communications network (e.g., a private local area network (LAN), a leased line, etc.).

A cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the electrical coupling can include a cable with an appropriate connector on either end for plugging into the HMD device 106 and device 102 or device 104. For example, the cable can include a USB connector on both ends. The USB connectors can be the same USB type connector or the USB connectors can each be a different type of USB connector. Either end of a cable used to couple device 102 or 104 to HMD 106 may be fixedly connected to device 102 or 104 and/or HMD 106.

Further implementations are summarized in the following examples:

EXAMPLE 1

A method comprising:
- receiving light through a lens positioned in an opening defined through a surface of a head-mounted display (HMD);
- reflecting an infrared light portion of the light off a display device of the HMD, the display device oriented generally parallel to the lens; and
- performing eye tracking based on the reflected infrared portion of the light.

EXAMPLE 2

The method of example 1, wherein reflecting the infrared light portion of the light off of the display device comprises reflecting the infrared light portion of the light off a layer positioned in front of the display device.

EXAMPLE 3

The method of example 2, further comprising passing a visible light portion of the light through the layer.

EXAMPLE 4

The method of examples 2 or 3, wherein the layer comprises a coating on the display device.

EXAMPLE 5

The method of examples 2 to 4, wherein the layer comprises a screen protector.

EXAMPLE 6

The method of examples 2 to 5, wherein the layer comprises a dichroic filter material.

EXAMPLE 7

The method of examples 2 to 6, wherein the display device is removably attachable to the HMD, and the layer is fixedly attached to the HMD and positioned to be in front of the display device when the display device is attached to the HMD.

EXAMPLE 8

The method of examples 1 to 6, wherein reflecting the infrared light portion of the light off the display device comprises forming a Fresnel reflection.

EXAMPLE 9

The method of examples 1 to 6, further comprising emitting infrared light toward an eye, wherein receiving the light through the lens comprises receiving an infrared image of the eye.

EXAMPLE 10

The method of example 9, further comprising emitting the infrared light within the HMD and/or external to the HMD.

EXAMPLE 11

The method of examples 1 to 10, further comprising reflecting the reflected infrared light portion of the light to an infrared sensor of the display device.

EXAMPLE 12

The method of examples 1 to 10, further comprising reflecting the reflected infrared light portion of the light to an infrared sensor integral with the HMD.

EXAMPLE 13

An apparatus comprising:
- a lens configured to pass light, the lens positioned in an opening defined through a surface of a head-mounted display (HMD);
- display device configured to reflect an infrared light portion of the light, the display device oriented generally parallel to the lens; and
- an imaging device configured to perform eye tracking based on the reflected infrared portion of the light.

EXAMPLE 14

The apparatus of example 13, wherein the display device comprises a surface configured to reflect the infrared light portion of the light, and pass a visible light portion of the light through the layer.

EXAMPLE 15

The apparatus of example 14, wherein the surface comprises a layer positioned in front of the display device.

EXAMPLE 16

The apparatus of examples 13 to 15, further comprising an emitter configured to emit infrared light toward an eye, wherein receiving the light through the lens comprises receiving an infrared image of the eye.

EXAMPLE 17

The apparatus of examples 13 to 16, wherein the imaging device comprises:

an imaging sensor to form images from the reflected infrared portion of the light; and a processor to perform the eye tracking based on the images.

EXAMPLE 18

A non-transitory machine-readable media storing machine-readable instructions that, when executed, cause a machine to at least:
receive light through a lens positioned in an opening defined through a surface of a head-mounted display (HMD);
reflect an infrared light portion of the light off a display device of the HMD, the display device oriented generally parallel to the lens; and
perform eye tracking based on the reflected infrared portion of the light.

FIG. 14 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

One or more of the elements and interfaces disclosed herein may be combined, divided, re-arranged, omitted, eliminated and/or implemented in any other way. Further, any of the disclosed elements and interfaces may be implemented by the example processor platforms P00 and P50 of FIG. 14, and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. Any of the elements and interfaces disclosed herein may, for example, be implemented as machine-readable instructions carried out by one or more processors. A processor, a controller and/or any other suitable processing device such as those shown in FIG. 14 may be used, configured and/or programmed to execute and/or carry out the examples disclosed herein. For example, any of these interfaces and elements may be embodied in program code and/or machine-readable instructions stored on a tangible and/or non-transitory computer-readable medium accessible by a processor, a computer and/or other machine having a processor, such as that discussed below in connection with FIG. 14. Machine-readable instructions comprise, for example, instructions that cause a processor, a computer and/or a machine having a processor to perform one or more particular processes. The order of execution of methods may be changed, and/or one or more of the blocks and/or interactions described may be changed, eliminated, sub-divided, or combined. Additionally, they may be carried out sequentially and/or carried out in parallel by, for example, separate processing threads, processors, devices, discrete logic, circuits, etc.

The example methods disclosed herein may, for example, be implemented as machine-readable instructions carried out by one or more processors. A processor, a controller and/or any other suitable processing device such as that shown in FIG. 14 may be used, configured and/or programmed to execute and/or carry out the example methods. For example, they may be embodied in program code and/or machine-readable instructions stored on a tangible and/or non-transitory computer-readable medium accessible by a processor, a computer and/or other machine having a processor, such as that discussed below in connection with FIG. 14. Machine-readable instructions comprise, for example, instructions that cause a processor, a computer and/or a machine having a processor to perform one or more particular processes. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

As used herein, the term "computer-readable medium" is expressly defined to include any type of computer-readable medium and to expressly exclude propagating signals. Example computer-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
   receiving light through a lens positioned in an opening defined through a surface of a head-mounted display (HMD);
   reflecting an infrared light portion of the light off a display device of the HMD, the display device oriented generally parallel to the lens;
   receiving, by an imaging device of the HMD, the infrared light portion of the light;
   capturing, by the imaging device, images corresponding to the received reflected infrared light portion of the light, at intermittent intervals of operation; and
   performing eye tracking based on the images captured by the imaging device.

2. The method of claim 1, wherein reflecting the infrared light portion of the light off of the display device comprises reflecting the infrared light portion of the light off a layer positioned in front of the display device.

3. The method of claim 2, further comprising passing a visible light portion of the light through the layer.

4. The method of claim 2, wherein the layer comprises a coating on the display device.

5. The method of claim 2, wherein the layer comprises a screen protector.

6. The method of claim 2, wherein the layer comprises a dichroic filter material.

7. The method of claim 2, wherein the display device is removably attachable to the HMD, and the layer is fixedly attached to the HMD and positioned to be in front of the display device when the display device is attached to the HMD.

8. The method of claim 1, wherein reflecting the infrared light portion of the light off the display device comprises forming a Fresnel reflection.

9. The method of claim 1, further comprising emitting infrared light toward an eye, wherein receiving the light through the lens comprises receiving an infrared image of the eye.

10. The method of claim 9, further comprising emitting the infrared light within the HMD or external to the HMD.

11. The method of claim 1, further comprising reflecting the reflected infrared light portion of the light to an infrared sensor of the display device.

12. The method of claim 1, further comprising reflecting the reflected infrared light portion of the light to an infrared sensor integral with the HMD.

13. The method of claim 1, wherein capturing images corresponding to the received reflected infrared light portion of the light at intermittent intervals of operation includes:
   controlling a light emitting diode (LED) driver to control at least one LED of the HMD such that the at least one LED is intermittently in an on state and an off state; and
   capturing images during intervals of operation corresponding to intervals when the at least one LED is in the on state.

14. The method of claim 1, wherein capturing images corresponding to the received reflected infrared light portion of the light at intermittent intervals of operation includes:
   controlling a light emitting diode (LED) driver to control at least one LED of the HMD such that the at least one LED is intermittently in an on state and an off state;
   capturing a first image during an interval of operation when the at least one LED is in the off state;
   capturing a second image during an interval of operation when the at least one LED is in the on state; and
   subtracting the first captured image from the second captured image to produce an image frame.

15. The method of claim 1, wherein capturing images corresponding to the received reflected infrared light portion of the light at intermittent intervals of operation includes:
   detecting a black interval between video frames output on the display;
   detecting whether the video frames output on the display correspond to high persistence video output or low persistence video output;

in response to detection of high persistence video output, controlling the imaging device and at least one light emitting diode (LED) of the HMD to capture a visible light image taken with visible light during the detected black interval; and in response to detection of low persistence video output, controlling the imaging device and the at least one LED to capture an visible light image taken with ambient light during the detected black interval.

16. An apparatus, comprising:

a lens configured to pass light, the lens positioned in an opening defined through a surface of a head-mounted display (HMD);

display device configured to reflect an infrared light portion of the light, the display device oriented generally parallel to the lens; and an imaging device configured to capture images based on the reflected infrared portion of the light during intermittent intervals of operation, and to perform eye tracking based on the captured images, including:

controlling a light emitting diode (LED) driver to control at least one LED of the HMD such that the at least one LED is intermittently in an on state and an off state; and capturing images only during set intervals of operation of the at least one LED.

17. The apparatus of claim 16, wherein the display device comprises a surface configured to reflect the infrared light portion of the light, and pass a visible light portion of the light through the layer.

18. The apparatus of claim 17, wherein the surface comprises a layer positioned in front of the display device.

19. The apparatus of claim 16, wherein the at least one LED includes an emitter configured to emit infrared light toward an eye, wherein receiving the light through the lens comprises receiving an infrared image of the eye.

20. The apparatus of claim 16, wherein the imaging device comprises:

an imaging sensor to capture the images from the reflected infrared portion of the light; and a processor to perform the eye tracking based on the captured images.

21. A non-transitory machine-readable media storing machine-readable instructions that, when executed, cause a machine to at least:

receive light through a lens positioned in an opening defined through a surface of a head-mounted display (HMD);

reflect an infrared light portion of the light off a display device of the HMD, the display device oriented generally parallel to the lens;

receive, by an imaging device of the HMD, the infrared light portion of the light;

capture, by the imaging device, images corresponding to the received reflected infrared light portion of the light, at intermittent intervals of operation; and perform eye tracking based on the images captured by the imaging device.

* * * * *